(12) United States Patent
Yamamoto

(10) Patent No.: US 11,721,824 B2
(45) Date of Patent: Aug. 8, 2023

(54) FUEL CELL

(71) Applicant: TOYOTA JIDOSHA KABUSHIKI KAISHA, Toyota (JP)

(72) Inventor: Hidenari Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/496,912

(22) Filed: Oct. 8, 2021

(65) Prior Publication Data

US 2022/0123340 A1    Apr. 21, 2022

(30) Foreign Application Priority Data

Oct. 16, 2020    (JP) .................. 2020-174576

(51) Int. Cl.
  *H01M 8/1004* (2016.01)
  *H01M 8/04119* (2016.01)
  *H01M 4/88* (2006.01)

(52) U.S. Cl.
  CPC ......... *H01M 8/1004* (2013.01); *H01M 4/881* (2013.01); *H01M 4/8807* (2013.01); *H01M 8/04149* (2013.01); *H01M 2300/0065* (2013.01)

(58) Field of Classification Search
  CPC ....... H01M 2300/0065; H01M 4/8605; H01M 4/8807; H01M 4/881; H01M 8/04149; H01M 8/1004; Y02E 60/50
  See application file for complete search history.

(56) References Cited

U.S. PATENT DOCUMENTS 8,518,596 B1 * 8/2013 Owejan ............... H01M 8/0234
                                                             429/480
2018/0269508 A1   9/2018 Asano et al.

FOREIGN PATENT DOCUMENTS

JP    2006120507 A    5/2006
JP    2018156819 A    10/2018

* cited by examiner

*Primary Examiner* — Victoria H Lynch
(74) *Attorney, Agent, or Firm* — Dickinson Wright, PLLC

(57) ABSTRACT

To provide a high-voltage fuel cell. The fuel cell is a fuel cell comprising an anode-side gas diffusion layer, an anode catalyst layer, an electrolyte membrane, a cathode catalyst layer and a cathode-side gas diffusion layer in this order, wherein a gas diffusion resistance ratio of the anode-side gas diffusion layer to the cathode-side gas diffusion layer is more than 1.50 and less than 2.79; wherein a gas diffusion resistance value of the cathode-side gas diffusion layer is 84 S/m or less at a relative humidity of 165%; and wherein a gas diffusion resistance value of the anode-side gas diffusion layer is less than 234 S/m at a relative humidity of 165%.

1 Claim, 1 Drawing Sheet

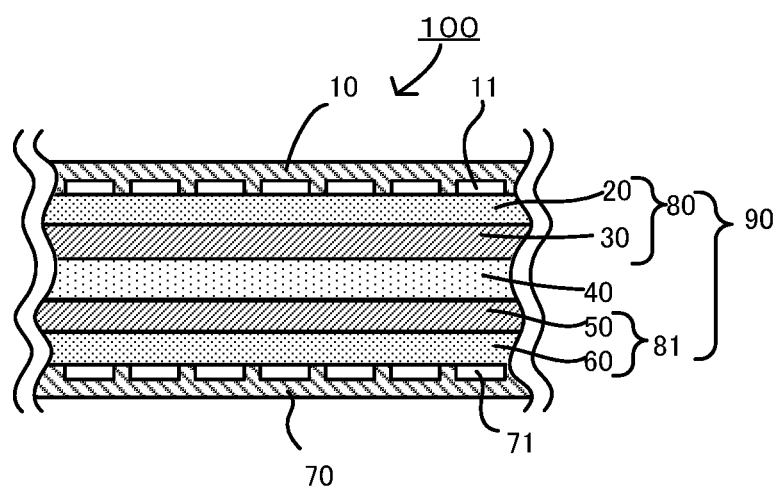

FUEL CELL

TECHNICAL FIELD

The present disclosure relates to a fuel cell.

BACKGROUND

A fuel cell (FC) is a power generation device comprising a single unit cell (hereinafter, it may be simply referred to as "cell") or a fuel cell stack (hereinafter, it may be simply referred to as "stack") which is a stack of unit cells, and it obtains electric energy by electrochemical reaction of hydrogen ($H_2$) as fuel gas and oxygen ($O_2$) as oxidant gas. Throughout this disclosure, fuel gas and oxidant gas may be simply referred to as "reaction gas" or "gas" without any particular distinction.

The unit cell as the fuel cell is generally composed of a membrane electrode assembly (MEA) and, as needed, two separators sandwiching both sides of the membrane electrode assembly.

The membrane electrode assembly has a structure in which a catalyst layer and a gas diffusion layer are sequentially formed on both surfaces of a solid polymer type electrolyte membrane (hereinafter simply referred to as "electrolyte membrane") having proton ($H^+$) conductivity. Accordingly, in some cases, the membrane electrode assembly is referred to as "membrane-electrode-gas diffusion layer assembly" (MEGA).

In general, the separator has a structure in which a groove as a reaction gas flow path is formed on a surface in contact with the gas diffusion layer. The separator also functions as a collector of generated electricity.

In the fuel electrode (anode) of the fuel cell, hydrogen supplied from the gas flow path and the gas diffusion layer, is protonated by the catalytic action of the catalyst layer, and the protonated hydrogen moves to the oxidant electrode (cathode) of the fuel cell through the electrolyte membrane. Electrons are generated at the same time, perform work through an external circuit, and then move to the cathode. Oxygen supplied to the cathode reacts with protons and electrons on the cathode, thereby producing water.

The produced water gives appropriate humidity to the electrolyte membrane, and excess water permeates through the gas diffusion layer and is discharged out of the system.

Various research has been conducted on fuel cells that are installed and used in fuel cell electric vehicles (hereinafter may be referred to as "vehicle").

For example, Patent Literature 1 discloses a technique such that, in a solid polymer fuel cell in which an anode-side gas diffusion layer, an anode catalyst layer, a polymer electrolyte membrane, a cathode catalyst layer, and a cathode-side gas diffusion layer are stacked in this order, the water vapor permeability ratio of the cathode-side gas diffusion layer to the anode-side gas diffusion layer is controlled from 1.1 to 1.5 for the purpose of reducing the frequency of hydrogen purge by suppressing an anode water discharge amount.

Patent Literature 2 discloses an electrolyte membrane-electrodes structure in which the water retention and drainage of each electrode are appropriately balanced even under low temperature and high humidity conditions, thereby obtaining a fuel cell exhibiting a high terminal voltage.

Patent Literature 1: Japanese Patent Application Laid-Open (JP-A) No. 2006-120507
Patent Literature 2: JP-A No. 2018-156819

One means of cost reduction of a fuel cell electric vehicle is to produce a fuel cell with high power density. In such a fuel cell, the role of the gas diffusion layer is significant. For example, power generation at a high current density of 2.0 $A/cm^2$ or more is required of the fuel cell. However, in the technique described in Patent Literature 1, the assumed current density during power generation is 1.0 $A/cm^2$ or less, for example, and it is a relatively low current density. Also, since the technique described in Patent Document 1 relates primarily to draining water on the cathode side, the amount of liquid water flowing from the cathode to the anode through the electrolyte membrane is small. Therefore, when the power generation of the fuel cell is carried out at a high current density, due to an increase in the amount of the produced water, flooding is likely to occur in the cathode. As a result, the voltage of the fuel cell decreases.

SUMMARY

An object of the present disclosure is to provide a high-voltage fuel cell.

In a first embodiment, there is provided a fuel cell comprising an anode-side gas diffusion layer, an anode catalyst layer, an electrolyte membrane, a cathode catalyst layer and a cathode-side gas diffusion layer in this order, wherein a gas diffusion resistance ratio of the anode-side gas diffusion layer to the cathode-side gas diffusion layer is more than 1.50 and less than 2.79; wherein the gas diffusion resistance value of the cathode-side gas diffusion layer is 84 S/m or less at a relative humidity of 165%; and wherein the gas diffusion resistance value of the anode-side gas diffusion layer is less than 234 S/m at a relative humidity of 165%.

The gas diffusion resistance ratio of the anode-side gas diffusion layer to the cathode-side gas diffusion layer may be from 1.85 to 2.49.

The gas diffusion resistance value of the cathode-side gas diffusion layer may be 75 S/m or more and 84 S/m or less at a relative humidity of 165%.

The gas diffusion resistance value of the anode-side gas diffusion layer may be 155 S/m or more and 187 S/m or less at a relative humidity of 165%.

According to the disclosed embodiments, a high-voltage fuel cell is provided.

BRIEF DESCRIPTION OF THE DRAWINGS

FIG. 1 is a schematic cross-sectional view of an example of the fuel cell according to the disclosed embodiments.

DETAILED DESCRIPTION

The fuel cell of the disclosed embodiments is a fuel cell comprising an anode-side gas diffusion layer, an anode catalyst layer, an electrolyte membrane, a cathode catalyst layer and a cathode-side gas diffusion layer in this order, wherein a gas diffusion resistance ratio of the anode-side gas diffusion layer to the cathode-side gas diffusion layer is more than 1.50 and less than 2.79; wherein the gas diffusion resistance value of the cathode-side gas diffusion layer is 84 S/m or less at a relative humidity of 165%; and wherein the gas diffusion resistance value of the anode-side gas diffusion layer is less than 234 S/m at a relative humidity of 165%.

When the power generation of the fuel cell is carried out in a high load condition (a current density of 2.0 $C/cm^2$ or more) in an operating temperature range of from a low temperature (30° C.) to a high temperature (100° C.), produced water is likely to be accumulated in the catalyst layer, the gas diffusion layer and so on, especially in a low temperature operating condition. Once the produced water is accumulated in the catalyst layer, the gas diffusion layer and so on, the voltage of the fuel cell decreases.

In the technique described in Patent Literature 1, the amount of liquid water flowing from the cathode to the anode through the electrolyte membrane is small, and flooding is likely to occur in the cathode.

In the high load condition of a current density of 2.0 A/cm$^2$ or more, since the amount of power generated by the fuel cell per electrode area is large, the amount of produced water is large. Accordingly, the produced water is likely to be accumulated in the catalyst layer, the gas diffusion layer and so on.

In the examples described in Patent Literature 1, the power generation of the fuel cell was carried out at a current density of approximately 1.0 A/cm$^2$. Accordingly, compared to the power generation of the fuel cell at a current density of 2.0 A/cm$^2$, the amount of produced water is about half and is small. In the examples described in Patent Literature 2, the power generation of the fuel cell was carried out at a current density of approximately 1.5 A/cm$^2$. Accordingly, compared to the power generation at a current density of 2.0 A/cm$^2$, the amount of produced water is small. In the power generation of the fuel cell in a high load condition of a current density of 2.0 A/cm$^2$ or more, if the amount of water discharged from the cathode to the anode is suppressed, flooding occurs in the cathode and, as a result, the voltage of the fuel cell decreases.

To ensure high performance of the fuel cell in a fuel cell operating temperature range of from low temperature to high temperature, it is necessary to optimize operating conditions including the relative humidity (RH) of the oxidant gas, the relative humidity of the fuel gas, and the gas flow rate (stoichiometry). To optimize them, it is important to control the flow of water in the fuel cell. To control the water flow in the fuel cell, it is necessary to precisely control the structure of the gas diffusion layer.

In conventional fuel cell systems, the function of the cathode-side and anode-side diffusion layers is not optimized. Therefore, in the prior art, it is difficult to sufficiently control the flow of water in the fuel cell, even if the operating conditions including the relative humidity of the oxidant gas, the relative humidity of the fuel gas, and the gas flow rate are optimized. In conventional fuel cell systems, therefore, it is difficult to suppress the occurrence of flooding and dry-up in the fuel cell, during the power generation of the fuel cell in the operating temperature range of from low temperature to high temperature.

As one example, when the power generation of the fuel cell is carried out in a low temperature condition of 70° C. or less, the amount of saturated water vapor is small, and the evaporation amount of produced water is small. As a result, flooding occurs in the cathode. Therefore, a required amount of gas (oxygen) does not reach the cathode catalyst layer, and the voltage of the fuel cell decreases.

For another example, when the power generation of the fuel cell is carried out in a high temperature condition of 100° C. or more, the amount of saturated water vapor is large, and the produced water is liable to evaporate. Therefore, the electrolyte membrane, the ionomer and so on are dried up by the heat of reaction, resulting in an increase in proton resistance and a decrease in the voltage of the fuel cell.

In the disclosed embodiments, the following effects are obtained. Even when the power generation of the fuel cell is carried out in a high load condition of a current density of 2.0 A/cm$^2$ or more, the occurrence of flooding in the cathode catalyst layer is suppressed, and the high-voltage fuel cell is obtained. Even when the power generation of the fuel cell is carried out at a low temperature of 70° C. or less, the occurrence of flooding in the cathode catalyst layer is suppressed, and the high-voltage fuel cell is obtained.

In the disclosed embodiments, "low temperature" means a temperature of 0° C. or more and 70° C. or less, and it may be 30° C. or more and 70° C. or less. In the disclosed embodiments, "high temperature" means a temperature of more than 70° C., and it may be 100° C. or more.

The fuel cell of the disclosed embodiments includes at least the anode-side gas diffusion layer, the anode catalyst layer, the electrolyte membrane, the cathode catalyst layer, and the cathode-side gas diffusion layer in this order.

The fuel cell may be a single unit cell, or it may be a stack of unit cells. The number of the stacked unit cells is not particularly limited. For example, two to several hundred unit cells may be stacked, or 2 to 200 unit cells may be stacked.

The fuel cell stack may include end plates at both ends in the stacking direction of the unit cells.

The unit cell includes at least a membrane electrode assembly.

The membrane electrode assembly includes the anode-side gas diffusion layer, the anode catalyst layer, the electrolyte membrane, the cathode catalyst layer and the cathode-side gas diffusion layer in this order.

The cathode includes the cathode catalyst layer and the cathode-side gas diffusion layer.

The anode includes the anode catalyst layer and the anode-side gas diffusion layer.

The cathode catalyst layer and the anode catalyst layer are collectively referred to as "catalyst layer".

The catalyst layer may contain, for example, a catalyst metal which promotes an electrochemical reaction, an electrolyte having proton conductivity, and carbon particles having electron conductivity.

As the catalyst metal, for example, platinum (Pt) or an alloy of Pt and another metal (such as Pt alloy mixed with cobalt, nickel or the like) may be used.

The electrolyte may be fluorine resin or the like. As the fluorine resin, for example, a Nafion solution may be used.

The catalyst metal is supported on carbon particles. In each catalyst layer, the carbon particles (i.e., catalyst particles) supporting the catalyst metal and the electrolyte may be mixed.

As the carbon particles for supporting the catalyst metal (i.e., supporting carbon particles), for example, water repellent carbon particles obtained by enhancing the water repellency of commercially available-carbon particles (carbon powder) by heating, may be used.

The cathode-side gas diffusion layer is a layer for diffusing oxidant gas (e.g., oxygen gas, air and dry air) in the cathode catalyst layer.

The anode-side gas diffusion layer is a layer for diffusing fuel gas (e.g., hydrogen gas) in the anode catalyst layer.

The cathode-side gas diffusion layer and the anode-side gas diffusion layer are collectively referred to as "gas diffusion layer".

The gas diffusion layer may be a conductive member having gas permeability, for example.

As the conductive member, examples include, but are not limited to, a porous material having conductivity. As the porous material, examples include, but are not limited to, a porous carbon material such as carbon cloth, carbon paper and glassy carbon, and a porous metal material such as metal mesh and metal foam.

The gas diffusion resistance ratio of the anode-side gas diffusion layer to the cathode-side gas diffusion layer is more than 1.50 and less than 2.79. From the viewpoint of increasing the voltage of the fuel cell, it may be from 1.85 to 2.49.

The gas diffusion resistance value of the cathode-side gas diffusion layer is 84 S/m or less at a relative humidity of 165%. The lower limit of the gas diffusion resistance value of the cathode-side gas diffusion layer at a relative humidity of 165%, is not particularly limited. The gas diffusion resistance value of the cathode-side gas diffusion layer at a relative humidity of 165% may be 75 S/m or more.

The gas diffusion resistance value of the anode-side gas diffusion layer may be less than 234 S/m at a relative humidity of 165%. From the viewpoint of increasing the voltage of the fuel cell, it may be 187 S/m or less. The lower limit of the gas diffusion resistance value of the anode-side gas diffusion layer at a relative humidity of 165%, is not particularly limited. The gas diffusion resistance value of the anode-side gas diffusion layer at a relative humidity of 165% may be 155 S/m or more.

The gas diffusion resistance of the gas diffusion layer can be adjusted by the thickness, density, porosity, etc., of the gas diffusion layer. As the thickness of the gas diffusion layer decreases, the gas diffusion resistance of the gas diffusion layer is thought to decrease. As the density of the gas diffusion layer decreases, the gas diffusion resistance of the gas diffusion layer is thought to decrease. As the porosity of the gas diffusion layer increases, the gas diffusion resistance of the gas diffusion layer is thought to decrease.

The electrolyte membrane may be a solid polymer electrolyte membrane. As the solid polymer electrolyte membrane, examples include, but are not limited to, a fluorine-based electrolyte membrane such as a thin film of perfluorosulfonic acid containing water, and a hydrocarbon-based electrolyte membrane. As the electrolyte membrane, for example, a Nafion membrane (manufactured by DuPont Co., Ltd.) may be used.

As needed, the unit cell may include two separators that sandwich both surfaces of the membrane electrode assembly. One of the two separators is an anode-side separator and the other is a cathode-side separator. In the disclosed embodiments, the anode-side separator and the cathode-side separator are collectively referred to as "separator".

The separator may have a supply hole and a discharge hole for allowing reaction gas and refrigerant to flow in the stacking direction of the unit cells. As the refrigerant, for example, a mixed solution of ethylene glycol and water can be used to prevent freezing at low temperature. The reaction gas is fuel gas or oxidant gas. The fuel gas may be hydrogen or the like. The oxidant gas may be oxygen, air, dry air or the like.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may have one or more fuel gas supply holes, one or more oxidant gas supply holes, one or more refrigerant supply holes, one or more fuel gas discharge holes, one or more oxidant gas discharge holes, and one or more refrigerant discharge holes.

The separator may have a reaction gas flow path on a surface in contact with the gas diffusion layer. On the surface opposite to the surface in contact with the gas diffusion layer, the separator may have a refrigerant flow path for keeping the temperature of the fuel cell constant.

When the separator is an anode-side separator, it may have one or more fuel gas supply holes, one or more oxidant gas supply holes, one or more refrigerant supply holes, one or more fuel gas discharge holes, one or more oxidant gas discharge holes, and one or more refrigerant discharge holes. On a surface in contact with the anode-side gas diffusion layer, the anode-side separator may have a fuel gas flow path for the fuel gas to flow from the fuel gas supply hole to the fuel gas discharge hole. On a surface opposite to the surface in contact with the anode-side gas diffusion layer, the anode-side separator may have a refrigerant flow path for the refrigerant to flow from the refrigerant supply hole to the refrigerant discharge hole.

When the separator is a cathode-side separator, it may have one or more fuel gas supply holes, one or more oxidant gas supply holes, one or more refrigerant supply holes, one or more fuel gas discharge holes, one or more oxidant gas discharge holes, and one or more refrigerant discharge holes. On a surface adjacent to the cathode-side gas diffusion layer, the cathode-side separator may have an oxidant gas flow path for the oxidant gas to flow from the oxidant gas supply hole to the oxidant gas discharge hole. On a surface opposite to the surface adjacent to the cathode-side gas diffusion layer, the cathode-side separator may have a refrigerant flow path for the refrigerant to flow from the refrigerant supply hole to the refrigerant discharge hole.

The separator may be a gas impermeable conductive member or the like. The conductive member may be, for example, dense carbon obtained by compressing carbon to be gas-impermeable, or a press-molded metal (e.g., iron, aluminum, stainless steel, or the like) plate. The separator may have a current collecting function.

The fuel cell stack may include a manifold such as an inlet manifold in communication with supply holes and an outlet manifold in communication with discharge holes.

As the inlet manifold, examples include, but are not limited to, an anode inlet manifold, a cathode inlet manifold and a refrigerant inlet manifold.

As the outlet manifold, examples include, but are not limited to, an anode outlet manifold, a cathode outlet manifold and a refrigerant outlet manifold.

FIG. 1 is a schematic cross-sectional view of an example of the fuel cell according to the disclosed embodiments.

In a fuel cell 100 shown in FIG. 1, a cathode-side separator 10, a cathode-side gas diffusion layer 20, a cathode catalyst layer 30, an electrolyte membrane 40, an anode catalyst layer 50, an anode-side gas diffusion layer 60, and an anode-side separator 70 are arranged in this order.

A membrane electrode assembly 90 includes the electrolyte membrane 40, a cathode 80 disposed on one surface of the electrolyte membrane 40, and an anode 81 disposed on the other surface thereof.

The cathode 80 includes the cathode-side gas diffusion layer 20 and the cathode catalyst layer 30.

The anode 81 includes the anode catalyst layer 50 and the anode-side gas diffusion layer 60.

The cathode-side separator 10 includes a flow path 11 for the oxidant gas to flow to the cathode-side gas diffusion layer 20. The anode-side separator 70 includes a flow path 71 for the fuel gas to flow to the anode-side gas diffusion layer 60.

EXAMPLES

Comparative Example 1

A fuel cell in which a cathode-side gas diffusion layer, a cathode catalyst layer, an electrolyte film, an anode catalyst layer, and an anode-side gas diffusion layer were arranged in this order, was prepared.

The area of the electrodes of the fuel cell was 192 cm².

As the cathode-side gas diffusion layer, a cathode-side gas diffusion layer having a gas diffusion resistance value of 84 S/m at a relative humidity of 165%, was used.

As the anode-side gas diffusion layer, an anode-side gas diffusion layer having a gas diffusion resistance value of 234 S/m at a relative humidity of 165%, was used.

The gas diffusion resistance ratio of the anode-side gas diffusion layer to the cathode-side gas diffusion layer was 2.79.

[Gas Diffusion Resistance Measurement]

The gas diffusion resistance of the cathode-side and anode-side gas diffusion layers at a relative humidity of 165%, was measured by the following method.

An evaluation cell including a given membrane electrode assembly and two given separators sandwiching the membrane electrode assembly, was used for the measurement. As the membrane electrode assembly, for example, PRIMEA GORE30 (manufactured by Gore) may be used. As the separators, for example, separators having a straight groove with a rib height of 0.2 mm and a groove depth of 0.4 mm may be used.

The measurement conditions are as follows. The temperature of the evaluation cell was 45° C. The area of the anode and cathode was 1 cm². As the fuel gas, hydrogen gas was used. As the oxidant gas, 1% oxygen was used. The gas flow rate of the anode was 0.5 NL/min. The gas flow rate of the cathode was 1.00 NL/min. The temperature of the anode gas was 100° C. The temperature of the cathode gas was 100° C. The relative humidity of the fuel gas was 55%. The relative humidity of the oxidant gas was 55%. The back pressure of the anode was 150 kPa. The back pressure of the cathode was 150 kPa. The voltage of the evaluation cell was swept from 0.95 V to 0.1 V at a sweep rate of 10 mV/s. Then, the voltage of the evaluation cell was swept from 0.1 V to 0.95 V at a sweep rate of 10 mV/s. These voltage sweeps were regarded as one cycle, and a total of three cycles were carried out as a cycle test to obtain a cathode-side current value and an anode-side current value. The gas diffusion resistance of the cathode-side gas diffusion layer was measured from the cathode-side current value obtained by the cycle test. The gas diffusion resistance of the anode-side gas diffusion layer was measured from the anode-side current value obtained by the cycle test. Measurement results are shown in Table 1. In Table 1, "An" means anode, and "Ca" means cathode.

Example 1

A fuel cell was prepared in the same manner as Comparative Example 1, except for the following aspects.

As the cathode-side gas diffusion layer, a cathode-side gas diffusion layer having a gas diffusion resistance value of 84 S/m at a relative humidity of 165%, was used.

As the anode-side gas diffusion layer, an anode-side gas diffusion layer having a gas diffusion resistance value of 187 S/m at a relative humidity of 165%, was used.

The gas diffusion resistance ratio of the anode-side gas diffusion layer to the cathode-side gas diffusion layer was 2.23.

Example 2

A fuel cell was prepared in the same manner as Comparative Example 1, except for the following aspects.

As the cathode-side gas diffusion layer, a cathode-side gas diffusion layer having a gas diffusion resistance value of 75 S/m at a relative humidity of 165%, was used.

As the anode-side gas diffusion layer, an anode-side gas diffusion layer having a gas diffusion resistance value of 187 S/m at a relative humidity of 165%, was used.

The gas diffusion resistance ratio of the anode-side gas diffusion layer to the cathode-side gas diffusion layer was 2.49.

Example 3

A fuel cell was prepared in the same manner as Comparative Example 1, except for the following aspects.

As the cathode-side gas diffusion layer, a cathode-side gas diffusion layer having a gas diffusion resistance value of 84 S/m at a relative humidity of 165%, was used.

As the anode-side gas diffusion layer, an anode-side gas diffusion layer having a gas diffusion resistance value of 155 S/m at a relative humidity of 165%, was used.

The gas diffusion resistance ratio of the anode-side gas diffusion layer to the cathode-side gas diffusion layer was 1.85.

Comparative Example 2

A fuel cell was prepared in the same manner as Comparative Example 1, except for the following aspects.

As the cathode-side gas diffusion layer, a cathode-side gas diffusion layer having a gas diffusion resistance value of 103 S/m at a relative humidity of 165%, was used.

As the anode-side gas diffusion layer, an anode-side gas diffusion layer having a gas diffusion resistance value of 155 S/m at a relative humidity of 165%, was used.

The gas diffusion resistance ratio of the anode-side gas diffusion layer to the cathode-side gas diffusion layer was 1.50.

Example 4

A fuel cell was prepared in the same manner as Comparative Example 1, except for the following aspects.

As the cathode-side gas diffusion layer, a cathode-side gas diffusion layer having a gas diffusion resistance value of 75 S/m at a relative humidity of 165%, was used.

As the anode-side gas diffusion layer, an anode-side gas diffusion layer having a gas diffusion resistance value of 155 S/m at a relative humidity of 165%, was used.

The gas diffusion resistance ratio of the anode-side gas diffusion layer to the cathode-side gas diffusion layer was 2.07.

[Voltage Evaluation]

Voltage evaluation was carried out on the fuel cells of Examples 1 to 4 and Comparative Examples 1 and 2.

The voltage of each fuel cell when the power generation of the fuel cell was carried out at a temperature of 40° C. and a current density of 2.4 A/cm², was measured. Also, the voltage of each fuel cell when the power generation of the fuel cell was carried out at 100° C. or more and a current density of 3.2 A/cm², was measured. Measurement results are shown in Table 1.

[Pressure Loss Evaluation]

Power generation of the fuel cells of Examples 1 to 4 and Comparative Examples 1 to 2, was carried out at 100° C. or more and a current density of 3.2 A/cm². At the same time, gas pressures at the gas inlet and outlet of each fuel cell were acquired by a pressure sensor. A pressure difference therebetween was calculated as a pressure loss. The pressure loss of the anode (An) and that of the cathode (Ca) were measured as described above, and the measurement results are shown in Table 1. The pressure losses of the anode (An) and cathode (Ca) of the fuel cells of Examples 1 to 4 and Comparative Examples 1 and 2, were found to be within the desired ranges.

TABLE 1

| | Voltage at 40° C. and 2.4 A/cm² | Voltage at 100° C. or more and 3.2 A/cm² | Pressure loss of An at 100° C. or more | Pressure loss of Ca at 100° C. or more | Gas diffusion resistance of Ca at 165% RH | Gas diffusion resistance of An at 165% RH | Gas diffusion resistance ratio (An/Ca) |
|---|---|---|---|---|---|---|---|
| Unit | V | V | kPa | kPa | S/m | S/m | — |
| Comparative Example 1 | 0.300 | 0.578 | 3.08 | 22.40 | 84 | 234 | 2.79 |
| Example 1 | 0.523 | 0.578 | 3.01 | 21.10 | 84 | 187 | 2.23 |
| Example 2 | 0.591 | 0.572 | 4.09 | 19.39 | 75 | 187 | 2.49 |
| Example 3 | 0.551 | 0.515 | 4.40 | 25.20 | 84 | 155 | 1.85 |
| Comparative Example 2 | 0.515 | 0.505 | 4.50 | 19.95 | 103 | 155 | 1.50 |
| Example 4 | 0.597 | 0.527 | 4.46 | 34.33 | 75 | 155 | 2.07 |

From Table 1, it is revealed that that the fuel cell of Comparative Example 1 does not obtain the desired voltage when the power generation of the fuel cell is carried out at 40° C. and a current density of 2.4 A/cm². Therefore, the voltage of the fuel cell of Comparative Example 1 is low during the power generation of the fuel cell in low temperature and high load conditions.

It is revealed that the fuel cell of Comparative Example 2 does not obtain the desired voltage when the power generation of the fuel cell is carried out at a current density of 3.2 A/cm² and 100° C. or more. Therefore, the voltage of the fuel cell of Comparative Example 2 is low during the power generation of the fuel cell in high temperature and high load conditions.

For the fuel cells of Examples 1 to 4, when the power generation of the fuel cells is carried out at a current density of 2.4 A/cm² and 40° C., the voltage of the fuel cells is higher than the fuel cells of Comparative Examples 1 and 2. Also for the fuel cells of Examples 1 to 4, when the power generation of the fuel cells is carried out at a current density of 3.2 A/cm² and 100° C. or more, the voltage of the fuel cells is higher than the fuel cells of Comparative Examples 1 and 2. For the fuel cells of Examples 1 to 4, therefore, the voltage is high when the power generation is carried out in low temperature and high load conditions, and the voltage is high when the power generation is carried out in high temperature and high load conditions.

Therefore, it is demonstrated that the voltage of the fuel cell in the operation temperature range of from low temperature to high temperature, is increased because the gas diffusion resistance ratio of the anode-side gas diffusion layer to the cathode-side gas diffusion layer is more than 1.50 and is less than 2.79, because the gas diffusion resistance value of the cathode-side gas diffusion layer is 84 S/m or less at a relative humidity of 165%, and because the gas diffusion resistance value of the anode-side gas diffusion layer is less than 234 S/m at a relative humidity of 165%.

REFERENCE SIGNS LIST

10: Cathode-side separator
11: Flow path
20: Cathode gas diffusion layer
30: Cathode catalyst layer
40: Electrolyte membrane
50: Anode catalyst layer
60: Anode-side gas diffusion layer
70: Anode-side separator
71: Flow path
80: Cathode
81: Anode
90: Membrane electrode assembly
100: Fuel cell

The invention claimed is:

1. A fuel cell comprising an anode-side gas diffusion layer, an anode catalyst layer, an electrolyte membrane, a cathode catalyst layer and a cathode-side gas diffusion layer in this order,
   wherein a gas diffusion resistance ratio of the anode-side gas diffusion layer to the cathode-side gas diffusion layer is from 1.85 to 2.49;
   wherein a gas diffusion resistance value of the cathode-side gas diffusion layer is 75 or more and 84 S/m or less at a relative humidity of 165%; and
   wherein a gas diffusion resistance value of the anode-side gas diffusion layer is 155 S/m or more and 187 S/m or less at a relative humidity of 165%.

\* \* \* \* \*